United States Patent [19]

Haraden

[11] Patent Number: 4,772,989

[45] Date of Patent: Sep. 20, 1988

[54] MOTOR VEHICLE HEADLIGHT MODULE

[75] Inventor: Thomas Haraden, Ipswich, Mass.

[73] Assignee: GTE Products Corporation, Danvers, Mass.

[21] Appl. No.: 16,616

[22] Filed: Feb. 19, 1987

[51] Int. Cl.[4] .......... B60Q 1/04

[52] U.S. Cl. .......... 362/80; 362/61; 362/226; 362/263

[58] Field of Search .......... 362/61, 80, 226, 263

[56] References Cited

U.S. PATENT DOCUMENTS 4,471,414 9/1984 Savage .......... 362/226
4,528,619 7/1985 Dolan .......... 362/61
4,631,651 12/1986 Bergin .......... 362/61

*Primary Examiner*—Douglas Hart
*Attorney, Agent, or Firm*—Lawrence R. Fraley

[57] ABSTRACT

A motor vehicle headlight module wherein the reflector includes a dual chambered protruding rear portion, a pair of conductive terminals securedly positioned within this rear portion, a contact member including an insulative body portion and a pair of electrical contacts positioned thereon and a lighting capsule (e.g., low wattage tungsten halogen) designed for being initially secured to the contact member such that this assembly (capsule-contact member) can then be precisely oriented within a first of the two chambers of the reflector. During such positioning, the contacts of the contact member are electrically connected (e.g., laser welded) to the pair of conductive terminals, respectively. An external connector (e.g., forming part of the vehicle's electrical circuitry) may then be positioned within the second chamber and thus electrically coupled to the precisely oriented capsule, said connection being established through the positioned conductive terminals. The invention is of extremely compact design and, in one embodiment, possessed an overall height of only about two inches and a width of about 2.5 inches, such that when utilized with other, similar modules in a headlighting assembly, resulted in an overall assembly having a relatively small total forward area. Greater aerodynamic capabilities are thus possible for any motor vehicle utilizing such an assembly.

10 Claims, 2 Drawing Sheets

MOTOR VEHICLE HEADLIGHT MODULE

CROSS REFERENCE TO COPENDING APPLICATIONS AND ISSUED PATENTS

In Ser. No. 598,604, now U.S. Pat. No. 4,545,001, entitled "Sealed Lens Member For Use In A Motor Vehicle Lighting System" (Inventors: G. J. English et al), there is defined a hollow, single piece lens member for use in a motor vehicle lighting system containing a plurality of individual lighting modules.

In Ser. No. 598,613, now U.S. Pat. No. 4,569,002, entitled "Motor Vehicle Lighting System" (Inventors: G. J. English et al), there is defined a motor vehicle lighting system wherein a plurality of modules are used in combination with a common lens member designed to control the light from the modules.

In Ser. No. 598,614, now U.S. Pat. No. 4,646,207, entitled "Motor Vehicle Lighting System Including A Sealed Lens Member As Part Thereof" (Inventors: R. E. Levin et al), there is defined a motor vehicle lighting system including a light source and reflector means, a hollow, enclosed lens having a contoured front surface with a rear lensing surface, and a means for mounting the lens in a recess of said vehicle to assure adequate passage of light from the source through the lens.

In Ser. No. 598,605, now Des. 285,351, entitled "Lamp-Reflector Module For Use In A Motor Vehicle Headlighting System" (Inventors: G. J. English et al), there is claimed the ornamental design for a lamp-reflector module for use in a motor vehicle lighting system.

In Ser. No. 598,606, now Des. 284,112, entitled "Lens Member For A Motor Vehicle Headlighting System" (Inventors: G. J. English et al), there is claimed the ornamental design for a motor vehicle headlight lens member having a plurality of stepped lensing surfaces thereon and a slightly curved forward surface.

In Ser. No. 598,607, now Des. 283,362, entitled "Lens Component For A Motor Vehicle Headlighting System" (Inventors: R. E. Levin et al), there is claimed the ornmental design for a motor vehicle headlight lens having a sloped, clear front surface, a pair of side walls, a bottom wall, and a stepped, rear lensing portion to in turn define a sealed, single piece component.

In Ser. No. 598,615, pending entitled "Lighting Module For Motor Vehicle Lighting System" (Inventors: G. J. English et al), there is defined a lighting module for use as a part of a vehicle headlighting system wherein the module includes a reflector, a small tungsten halogen capsule sealed within the reflector, and a clear, front cover providing a seal for the module.

All of the above-identified applications were filed Apr. 10, 1984 and are assigned to the same assignee as the instant invention.

In addition to the above, in Ser. No. 840,271, now U.S. Pat. No. 4,707,767 entitled "Motor Vehicle Headlight Module" (Inventors: J. A. Pergin et al), there is defined a headlight module of compact design wherein a connector is provided which is designed for being slidably located on the projecting rear neck portion of the module's reflector. A retention means projects from the reflector to engage (e.g., lock onto) the connector and hold it in position.

In Ser. No. 840,268, now U.S. Pat. No. 4,660,128 entitled "Motor Vehicle Lighting Assembly" (Inventors: J. A. Bergin et al), there is defined a headlight lighting assembly wherein a plurality of modules are utilized. Each module, including a singular reflector and small tungsten halogen light source (capsule) is designed to fit within a respective compartment of a common holder. The holder in turn may be aligned within the designated motor vehicle.

Both of these latter applications, filed Mar. 17, 1986, are assigned to the same assignee as the instant application.

TECHNICAL FIELD

The present invention relates in general to a new and improved headlight module for use within a lighting assembly for motor vehicles. More particularly, the present invention relates to a headlighting module for use in an improved lighting assembly designed specifically to provide for improved aerodynamic performance of the motor vehicle using same and for ease of replacement of the modules employed therein. One specific example of such an assembly in which the invention may be readily employed as a part thereof is the assembly defined in the aforementioned Ser. No. 840,268.

BACKGROUND

Excluding those mentioned above and those defined in the patents mentioned immediately below the following Table, sealed beam lighting systems used in motor vehicles, and in particular those for providing forward illumination for automobiles, have generally not been designed with aerodynamic considerations in mind. As such, these lighting systems have exhibited poor aerodynamic performance. The typical minimum height of headlights (headlamps) found in such lighting systems is no less than about four inches (some as high as seven inches), including systems having four rectangular headlamps (two per side) as part thereof. Of equal importance is the total area of the headlighting system when viewed from the front. In many existing systems, total vertical areas of about seventy to ninety square inches are common. Understandably, such large areas contribute to poor aerodynamic performance of the respective motor vehicles. In this regard, the following Table is a list of many existing (again excluding those mentioned above and immediately below) multiple headlamp lighting systems illustrating the approximate height and total frontal (vertical) area of each system listed.

TABLE

| System Sealed Beam Headlamps | Headlamp Type | Approx. Height (Inches) | Approximate Total System Area (Sq. Inches) |
|---|---|---|---|
| 2 Lamp, Round | 2D | 7 | 77 |
| 4 Lamp, Round | IC/2C | 5¾ | 87 |
| 2 Lamp, Rectangular | 2B | 5½ | 83 |
| 4 Lamp, Rectangular | 1A/2A | 4 | 96 |
| 2 Lamp, Rectangular | 2E | 4 | 48 |

In a replaceable system not referred to in the above Table, a lamp capsule-holder component is replaced within a fixed reflector-lens combination (i.e., through a rear opening in the reflector) and sealed therein (i.e., using an O-ring seal). Examples of such systems are described in U.S. Pat. Nos. 4,623,958 (Van der Linde et al), 4,631,651 (Bergin et al), 4,569,005 (Bergin et al) and 4,569,006 (Bergin et al). These systems are especially designed to provide enhanced aerodynamics, and typically include only one headlight per side of the vehicle. The lens, usually of impact-resistant plastic, is shaped to match the vehicle's front contour and is usually fixedly secured relative thereto. The replaceable capsule-holder component (both members being sealed together to define an integral, replaceable component) is then rotatively or directly inserted within the assembly's reflector, which may or may not include the lens as part thereof. Typically, the lens is a separate component and is also hermetically sealed to the reflector.

Although such a system provides desired aerodynamic features, alignment between the capsule and holder (and thus with the reflector in which this integral component is positioned) is critical and sometimes difficult to attain. That is, there exists a potential problem regarding close tolerance control, particularly between capsule and holder members during assembly thereof. Attainment of such close tolerance control is usually accomplished through utilization of relatively complicated procedures using complex equipment. With lighting systems such as those of the aforementioned replaceable type and those mentioned in the Table above, there is also the problem that when a headlamp burns out, a major portion of the forward light pattern is lost due to the inability of only the single headlamp remaining (assuming a two headlamp arrangement is utilized) to provide sufficient forward illumination. In a four headlamp system (two per side) a significant reduction in output on one side of the vehicle occurs. Still another problem in a system with separate headlamps being used for high and low beam is the inherent lack of flexibility, particularly in optimizing both high and low beam patterns. In those systems in which two filaments are employed in a single lens-reflector combination, the lens element can typically be optimized for only one pattern. Switching to the second filament results in a compromised light distribution.

Lastly, and perhaps most significantly, headlamp systems of the replaceable type and of the type described in the above Table typically mandate relatively complex alignment procedures (which are usually only capable of being accomplished by a skilled technician) to both maintain the headlamp in required alignment and to assure that a replacement therefor is in turn also correctly oriented within the vehicle. Understandably, such requirements add to the cost of maintaining the headlamp system using such components and thus of the vehicle utilizing same.

DISCLOSURE OF THE INVENTION

It is, therefore, a primary object of the present invention to provide a new and improved motor vehicle headlight module which, when used with other, similar modules in a headlighting system (such as defined in Ser. No. 840,268), results in a system which obviates the disadvantages associated with existing vehicle lighting systems of the currently available replaceable type and of the type described in the above Table.

It is a further object of the invention to provide a module of the type mentioned above which can be readily connected to the vehicle's electrical system, thus assuming relative ease of assembly within the vehicle and eventual replacement (if necessary) by a vehicle owner.

Another object of the invention is to provide a new and improved motor vehicle headlight module wherein such replacement can be readily accomplished while assuring precise alignment thereof within the system's holder or similar member to thereby assure optimum light output from the assembled device.

Still another object of the invention is to provide a headlight module which can be produced on a mass production scale, and which is therefore relatively inexpensive to the consumer.

In accordance with one aspect of the invention, there is provided a motor vehicle headlight module designed specifically for use in a motor vehicle headlight assembly which in turn may form part of an overall lighting system for use in the motor vehicle. Thus, the module is adaptable for use with other, similar modules within a common holder member or the like. This assembly, containing a plurality (e.g., four) of such modules can thus serve as the headlight assembly for one side of the designated vehicle. As defined herein, the module comprises a reflector including a forward lens secured thereto or forming part thereof, the reflector including a protruding rear portion having an aperture therein and defining first and second chambers therein. Securedly positioned within the reflector's protruding rear portion are first and second electrically conductive terminals each of which includes a first segment located relative to the first chamber and a second segment projecting within the second chamber for being connected to an external connector. The module further comprises a contact member including an electrically insulative body portion and first and second electrical contacts spacedly positioned thereon, this contact member located within the reflector's first chamber such that both electrical contacts are electrically connected to the first and second conductive terminals, respectively. The module further includes a lighting capsule which in turn includes an envelope and a pair of conductive lead-in wires projecting therefrom each of which are connected to a respective one of the electrical contacts of a contact member such that the envelope is positioned at a preestablished distance from these contacts. The capsule is located substantially within the aperture of the reflector and extends within the reflector relative to the reflecting surfaces thereof.

BRIEF DESCRIPTION OF THE DRAWING

The foregoing and other features of the invention will be more particularly described in connection with the best mode for carrying out the invention, and with reference to the accompanying drawing, wherein.

BEST MODE FOR CARRYING OUT THE INVENTION

Figure 1:
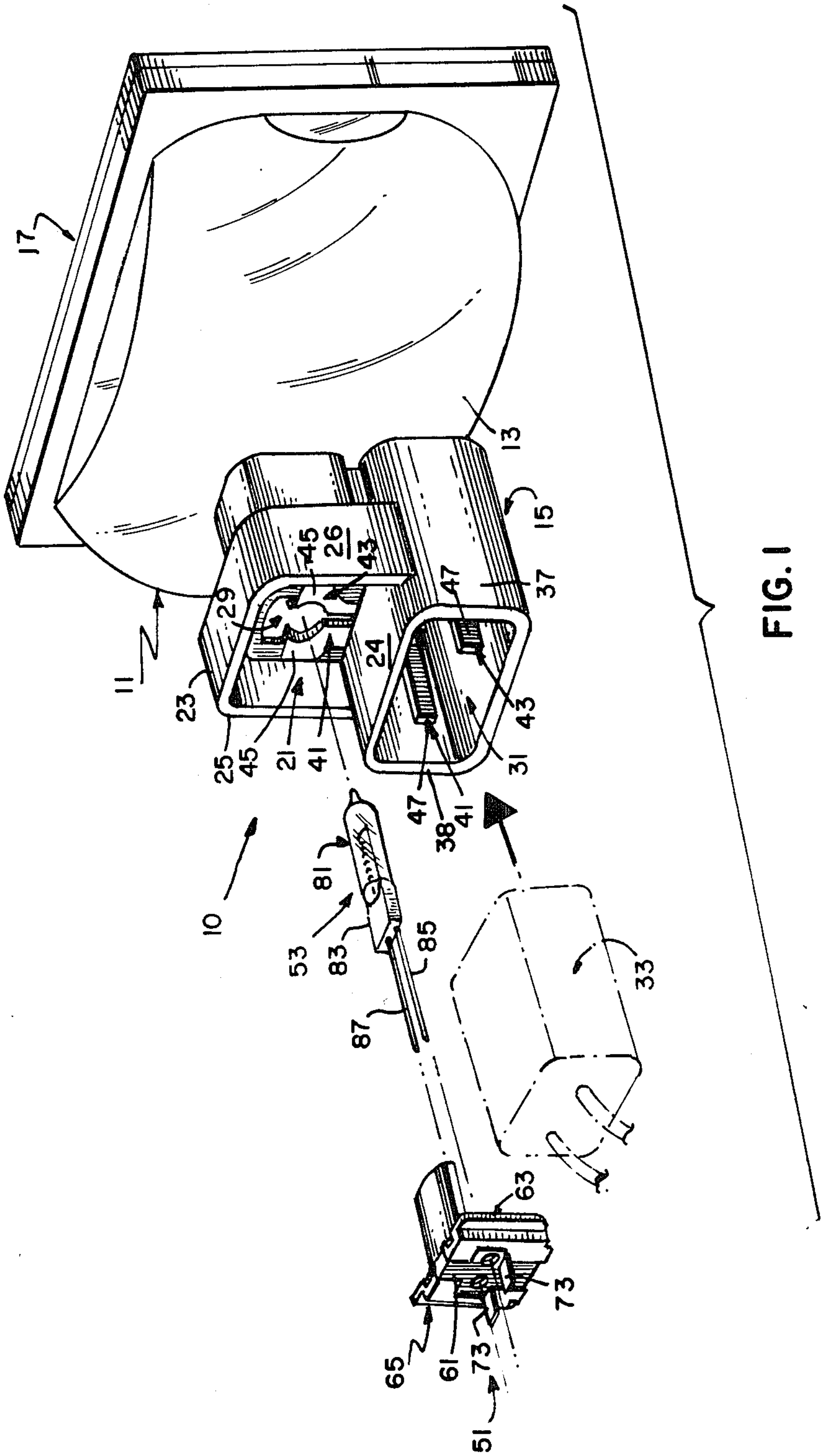
FIG. 1 is an exploded perspective view showing a motor vehicle headlight module constructed in accordance with the teaching of the present invention.

For a better understanding of the present invention, together with other and further objects, advantages and capabilities thereof, reference is made to the following disclosure and appended claims in connection with the above-described drawings.

With particular attention to the Drawings, there is illustrated a motor vehicle headlight module 10 in accordance with a preferred embodiment of the invention. As stated, module 10 is adapted for use within a motor vehicle lighting assembly as part thereof, one example of such an assembly being defined in Ser. No. 840,268, the disclosure of which is incorporated herein by reference. More specifically, module 10 is adapted for being positioned within a common holder member or the like such as described in Ser. No. 840,268 to be aligned therein such that the completed assembly (including a plurality, e.g., four, of such modules) can then be aligned within the respective motor vehicle in which the assembly is utilized. Advantageously, the assembly as defined in Ser. No. 840,268 possesses a small overall height and occupies a relatively small frontal area, thus allowing the vehicle in which it is located to possess a correspondingly reduced frontal section. Improved aerodynamics are thus realized. Additional features of such an arrangement are fully described in Ser. No. 840,268.

As shown in FIG. 1, module 10 includes an electrically insulative (e.g., plastic) reflector 11 which includes a reflecting portion 13 which has projecting therefrom a protruding rear neck portion 15. As will be defined below, this neck portion constitutes a key feature of the instant invention and represents a significant improvement over earlier designs. Reflector 11 also includes a forward lens member 17 which is secured across the reflector's forward, rectangular opening to provide a closure therefor. Lens 17 is preferably glass (e.g., borosilicate) and is secured to the reflector's forward portion by a suitable adhesive known in the art.

Figure 3:
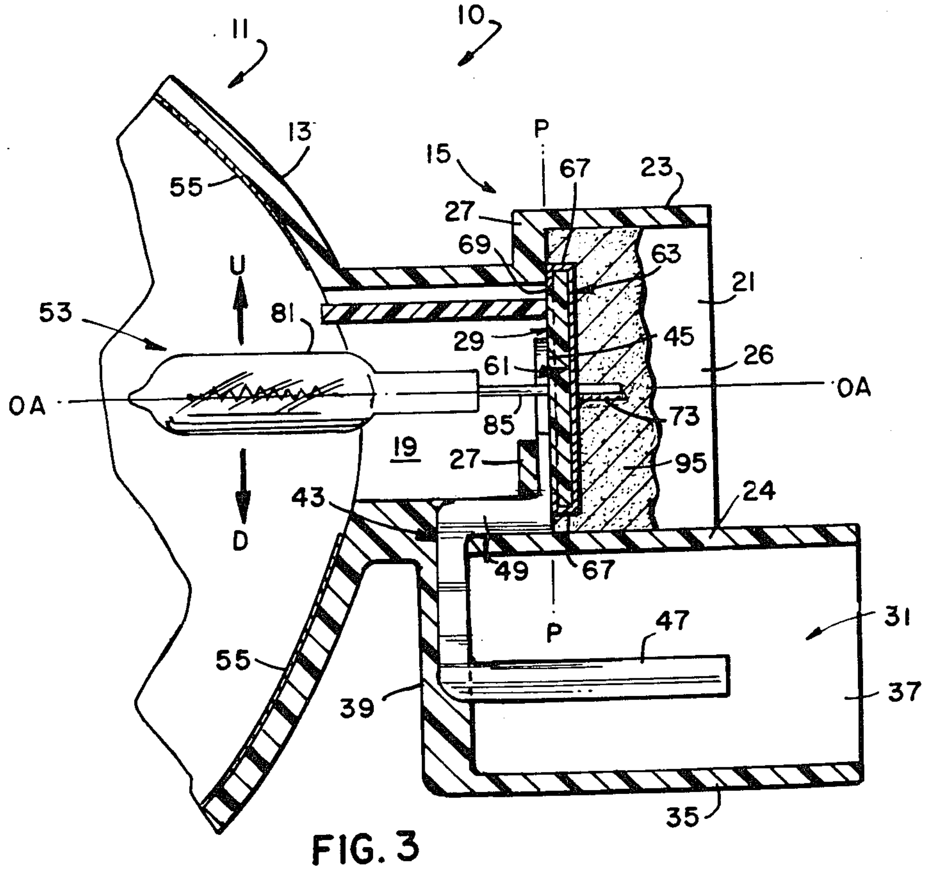
FIG. 3 is an elevational sectional view showing a portion of the structure of FIGS. 1 and 2 in the assembled condition.

Reflector 11, as also shown in FIG. 3, further includes an aperture 19 therein which passes from the reflecting portion of the reflector through the protruding rear portion to a first chamber 21 formed at the rear thereof. Rear chamber 21, as shown, is of substantially rectangular (boxlike) configuration and is defined by upper and lower parallel walls 23 and 24, by parallel side walls 25 (FIG. 1) and 26, and by a rear wall 27 having an opening 29 therein. Located below first chamber 21 is a second chamber 31 which is separated from first chamber 21 by a common wall 24 and which serves to house (receive) an external connector 33 (shown in phantom in FIG. 1) which in turn is connected to or forms part of the motor vehicle's electrical system. Chamber 31, like upper chamber 21, is defined by opposing pairs of parallel walls (upper and lower walls 24 and 35, and opposing side walls 37 and 38) in addition to a back wall 39 which depends (projects) downwardly from the part of the protruding rear portion of reflector 11 in which aperture 19 is located. Chamber 31 is thus also of substantially rectangular (boxlike) configuration.

Module 10 further includes first and second electrically conductive terminals 41 and 43 (only 43 shown in FIG. 3) which are securedly positioned within the reflector's protruding rear neck portion. Each conductive terminal includes a first segment 45 located within rear portion 15 relative to first chamber 21 and a second segment 47 which passes through the common wall 24 and projects within the second chamber 31. As stated, the first segment 45 of each terminal is located relative to the first chamber 21. This is meant to include the situation wherein the first segment protrudes within first chamber 21 or, alternatively, lies substantially flush within the rear wall 27 thereof (as shown in FIG. 3). The illustrated second segments 47 which project within second chamber 31 are specifically designed for being electrically coupled to contacts (not shown) located within the connector 33. Preferably, such contacts are spring-type contacts for engaging opposite sides of the substantially flat, male protruding second segments. Interconnecting segments 45 and 47 is a main body segment 49 which, as shown in FIG. 3, is also embedded within the rear wall 39 of rear portion 15. Such an arrangement, in addition to the positioning of first segment 45 within wall 27, serves to firmly secure the terminals in the desired orientation. Positioning in such a fixed relationship is considered important for the reasons cited hereinbelow. Significantly, the substantially flat first segments 45 of terminals 41 and 43 occupy a common, first plane (P—P in FIG. 3) when so positioned within reflector 11.

Module 10 further includes a contact member 51 which, as defined, is designed for being positioned within first chamber 21 of reflector 11 in a predetermined, aligned manner such that the module's light source (lighting capsule 53) will be properly aligned within reflector 11 relative to the reflecting surfaces of portion 13. Such reflecting surfaces are typically located on the internal walls of reflecting portion 13 and, in one embodiment were of a thin coating of aluminum reflecting material 55 (FIG. 3). The walls of reflecting portion 13 are also preferably of substantially parabolic configuration and terminate at the outer extremeties thereof (upper, lower and side) in substantially flat, parallel portions (see FIG. 1).

Figure 2:
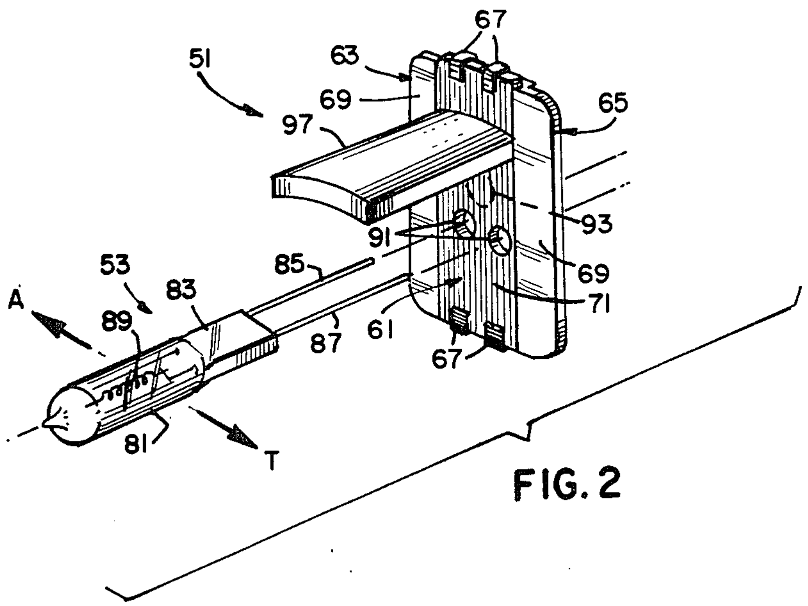
FIG. 2 is an exploded perspective view showing a portion of the structure of FIG. 1 on an enlarged scale for clarity.

Contact member 51 includes an electrically insulative (e.g., plastic) body portion 61 and first and second electrical contacts 63 and 65 which are spacedly positioned on body portion 61 and secured thereto. This preferred securement, as shown in FIG. 2, is achieved through the utilization of projecting tabs 67, two of which project from opposite ends of each contact and are formed about the upper and lower ends of the insulative body portion. Contacts 63 and 65, being electrically isolated by the insulative body portion, each project outwardly therefrom and include a flattened contacting segment 69 designed for being electrically connected to a respective one of the first segments 45 of the securedly positioned conductive terminals 41 and 43. Significantly, both of the contacting segments 69 occupy a common plane with the forward, planar surface 71 of body portion 61 to define a combined flat surface for this portion of member 51. Significantly, when contact member 51 is positioned within chamber 21 (as shown in FIG. 3) the plane defined by this forward, flat surface lies co-planar with the plane (P—P) defined by the positioned first segments of conductive terminals 41 and 43. This represents an important feature of the invention in that it facilitates alignment of the contact member which in turn facilitates alignment of lighting capsule 53. This alignment will be defined in greater detail hereinbelow. Projecting rearwardly from each electrical contact is a tab segment 73 which, as shown, extends substantially perpendicular to the plane defined by the forward surface 71 of contact member 51.

As stated, module 10 further includes a lighting capsule 53 which in turn includes an envelope 81 having a press sealed end 83 from which projects a pair of conductive lead-in wires 85 and 87 (only wire 85 shown in FIG. 3), said wires in turn electrically coupled to the filament 89 located within the capsule's envelope. Capsule 53 is preferably a low wattage, tungsten halogen capsule. By low wattage is meant a wattage no greater than about 25 watts and by tungsten halogen is meant a capsule wherein the filament is a coiled tungsten configuration and wherein the atmosphere contained within the envelope includes a halogen. Tungsten halogen lamps are well known in the art and further description is thus not believed necessary. Capsule 53 is secured to contact member 51 by attaching (e.g., welding) each of the projecting lead-in wire conductors to a respective tab segment 73 of the electrical contacts 63 and 65. Only one wire (85) is shown in FIG. 3 but it is understood that both wires are so connected, particularly considering the illustrations in FIGS. 1 and 2. Thus, wire 85 is connected to the tab segment 73 of contact 63 while wire 87 is connected to the corresponding tab segment of contact 65. Such connection is deemed a significant feature of the invention in that it enables precise orientation of the capsule (and particularly its internally contained filament structure) relative to the planar contacting surfaces 69 of the contact member's secured contacts.

In assembly, the lead-in wire conductors are inserted within corresponding apertures 91 (FIG. 2) in the insulative body portion 61 to a preestablished depth and thereafter secured (welded) to tab segments 73. Should excessive wire exist, it may be trimmed (cut) at this time such that the terminal ends of each wire lie substantially flush with the ends of tab segments 73 (as shown in FIG. 3). Alternatively, tab segments 73 could each be in the form of a hollow eyelet as an integral part of the respective contact with the respective wire passing therethrough. Such an arrangement would enable each wire to be secured to such an eyelet by soldering. Such an eyelet could also be a separate element used to retain the respective contact to the insulative body portion. In an even more simpler form than any of the above, the segments could be eliminated altogether and the wire conductors directly secured (e.g., soldered or welded) to the respective contact after passing through an aperture therein. Because such attachment precisely orients the capsule relative to the contact member's forward contacting surfaces, it also precisely orients the capsule relative to the reflector's reflecting surfaces 55 once the capsule-contact member assembly is fully positioned within chamber 21 in contact with the respective first segments of terminals 41 and 43. As will be further defined, this represents but one of three orientations for capsule 53 as provided by the instant invention. Once assembled, contact member 51 is inserted within chamber 21 such that the forward contacting surfaces 69 thereof engage and lie flush against the described first segments, thus occupying the aforementioned co-planar orientation. Prior to such positioning, however, glass lens 17 is sealed to the forward opening of reflector 11 (e.g., using a suitable epoxy known in the art). Preferably, the reflector during such orientation is positioned face down, enabling the capsule and contact member assembly to be vertically lowered through the rear of the reflector (through chamber 21 and aperture 19). The capsule is thus strategically positioned at a precise depth within reflector 11 and must now be aligned respective to the optical axis OA—OA (FIG. 3) thereof. This is accomplished next by moving the capsule-contact member assembly along two planes by a suitable mechanism (e.g., using a contact member gripping mechanism which projects downwardly). These two planes of movement are understood to be substantially perpendicular to each other, thus representing two additional directions of orientation for capsule 53. In FIG. 3, for example, capsule 53 may be moved upwardly and/or downwardly (directions U and D, respectively) along a first such plane. Additionally, capsule 53 (and contact member 51) may also be moved along a plane perpendicular to the optical axis OA—OA in FIG. 3 (and thus toward and/or away from the viewer). These opposing directions are represented by the directional arrows T and A in FIG. 2. Thus it can be seen that the opposing directions of movement (T and A) occupy a plane substantially vertical to those directions (D and U) shown in FIG. 3. Once the capsule-contact member assembly is precisely oriented in the predetermined orientation within reflector 11, the first and second electrical contacts 63 and 65 of the contact member are electrically connected (e.g., welded) to the corresponding first segments 45 of terminals 41 and 43. As stated, this preferred means of securement is by welding, and, more specifically, using laser welders directed downwardly through chamber 21.

With capsule 53 now precisely oriented within reflector 11, the reflector may be subjected to various flushing and fill operations (e.g., nitrogen flush) known in the art. Such flushing and filling can occur through an opening 93 (shown in phantom in FIG. 2) provided within insulative portion 61. Subsequently, this opening is sealed as are any remaining open portions (e.g., openings 91) using a quantity of sealant 95 (FIG. 3) which is deposited within first chamber 21. As shown, sealant 95 substantially covers the secured contact member and thus provides an effective seal for chamber 21. In a preferred embodiment, sealant 95 was an epoxy material applied in liquid form and subsequently hardened.

To provide increased protection for the interior surfaces of the plastic reflector 11 from the heat generated by capsule 53 during operation of module 10, contact member 51 may further include a projecting heat shield 97 which extends perpendicularly from the planar body portion 61 and, as shown in FIG. 3, is located above designated portions of capsule 53 and between these portions and the internal surfaces of the reflector's protruding rear portion 15. Shield 97 may form part of the insulative body portion 61 of contact member 53 or, alternatively, may be secured thereto (e.g., by a suitable adhesive) as a separate part. Still further, this shield may be a totally separate element inserted within the reflector and secured therein.

As stated, reflector 11 is preferably of plastic. More preferably, the reflector is comprised of a thermoplastic and even more specifically, of a thermoplastic sold under the trademark Ryton by the Phillips Chemical Company, Bartlesville, Okla. The insulative body portion 61 of contact member 53 is also plastic, and preferably a thermoplastic sold under the trademark Xydar by Dartco Manufacturing, Inc., Augusta, Ga. Both the conductive terminals 41 and 43, as well as both of the electrical contacts 63 and 65, are metallic with a preferred material being a copper alloy (e.g., brass). Sealant 95, as defined, is preferably an epoxy cured using infrared radiation and thus readily adaptable to mass production.

Thus there has been shown and described a motor vehicle headlight module which is of relatively compact design (in one embodiment, the invention possessed an overall forward height of only about two inches and a width of about 2.5 inches) and which can be readily produced using mass production techniques. Most significantly, the invention defines a headlight module wherein the contained light source can be precisely oriented in a relatively facile manner.

While there have been shown and described what are present considered the preferred embodiments of the invention, it will be obvious to those skilled in the art that various changes and modifications may be made therein without departing from the scope of the invention as defined by the appended claims.

What is claimed is:

1. A motor vehicle headlight module comprising:

a reflector including a forward lens member secured thereto or forming part thereof, said reflector including a protruding rear portion having an aperture located therein and defining first and second chambers there;

first and second electrically conductive terminals securedly positioned within said protruding rear portion of said reflector, each of said terminals including a first segment located relative to said first chamber and a second segment projecting within said second chamber for being connected to an external connector, said first segments disposed in a first plane within said reflector which plane is perpendicular to an imaginary line extending from said aperture toward said forward lens, to form an optical axis;

a contact member including an electrically insulative body portion and first and second electrical contacts spacedly positioned on said body portion in a second plane, said contact member securedly positioned within said first chamber of said protruding rear portion of said reflector in a predetermined, aligned manner with said first plane co-planar with said second plane such that said first and second electrical contacts are electrically connected to said first and second electrically conductive terminals; and a lighting capsule including an envelope and a pair of conductive lead-in wires projecting therefrom, each of said lead-in wires connected to a respective one of said electrical contacts of said contact member such that said envelope is positioned at a pre-established distance from said contacts, said capsule located substantially within said aperture of said reflector and extending within said reflector relative to the reflecting surfaces thereof.

2. The motor vehicle headlight module according to claim 1 wherein said reflector is plastic material.

3. The motor vehicle headlight module according to claim 1 wherein said lens is secured to said reflector, said lens comprised of glass material.

4. The motor vehicle headlight module according to claim 1 wherein said first and second chambers within said protruding rear portion of said reflector are separated by a common wall, each of said conductive terminals passing through said wall.

5. The motor vehicle headlight module according to claim 1 wherein said body portion of said contact member is comprised of plastic material and each of said electrical contacts is metallic.

6. The motor vehicle headlight module according to claim 1 wherein said plastic material of said body portion is a thermoplastic and said metallic material of said contacts is a copper alloy.

7. The motor vehicle headlight module according to claim 1 wherein said lighting capsule is a low wattage tungsten halogen capsule.

8. The motor vehicle headlight module according to claim 1 further including a quantity of sealant located within said first chamber of said protruding rear portion of said reflector, said sealant substantially covering said contact member and providing a seal for said first chamber.

9. The motor vehicle headlight module according to claim 1 wherein said sealant is an epoxy material.

10. The motor vehicle headlight of claim 1 wherein said first segments of said first and second electrically conductive terminals are substantially flat and said electrical contacts are each provided with a segment thereof which is substantially flat and lies within said second plane whereby with said first and second planes co-planar, said first segments may be moved relative to said contact segments along said planes to a plurality of positions wherein said first and second electrical contacts remain electrically connected to said first and second electrically conductive terminals.

* * * * *